US009815401B2

(12) United States Patent
Nagao et al.

(10) Patent No.: US 9,815,401 B2
(45) Date of Patent: Nov. 14, 2017

(54) APPARATUS FOR DRIVING LIGHT EMITTING DEVICE

(71) Applicant: ROHM CO., LTD., Kyoto (JP)

(72) Inventors: Kei Nagao, Kyoto (JP); Toru Takahashi, Kyoto (JP); Toru Takuma, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 15/285,831

(22) Filed: Oct. 5, 2016

(65) Prior Publication Data
US 2017/0101052 A1  Apr. 13, 2017

(30) Foreign Application Priority Data
Oct. 8, 2015  (JP) ................................ 2015-200198

(51) Int. Cl.
H05B 37/02 (2006.01)
B60Q 3/04 (2006.01)
H05B 33/08 (2006.01)

(52) U.S. Cl.
CPC ......... *B60Q 3/044* (2013.01); *H05B 33/0815* (2013.01); *H05B 33/0839* (2013.01)

(58) Field of Classification Search
CPC ........................ H05B 33/0815; H05B 33/0839
USPC ..................... 315/209 R, 291, 294, 297, 302
See application file for complete search history.

(56) References Cited

U.S. PATENT DOCUMENTS

| 8,482,225 B2* | 7/2013 | Szczeszynski | ..... H05B 33/0851 315/185 R |
| 9,167,647 B1* | 10/2015 | Takekawa | .......... H05B 33/0845 |
| 2009/0003007 A1* | 1/2009 | Kitagawa | ........... H05B 33/0815 362/464 |
| 2009/0212710 A1* | 8/2009 | Matsui | ............... H05B 33/0818 315/209 R |

FOREIGN PATENT DOCUMENTS

JP   2013-225568   10/2013

* cited by examiner

*Primary Examiner* — Thuy Vinh Tran
(74) *Attorney, Agent, or Firm* — Fish & Richardson P.C.

(57) ABSTRACT

An apparatus for driving a light emitting device includes a constant current control circuit configured to control a current flowing through the light emitting device to be constant, and an extension circuit configured to generate a post-extending PWM signal obtained by extending a period of an input PWM signal having a first level. The constant current control circuit is turned on during the period of the post-extending PWM signal having the first level, and the constant current control circuit is turned off during a period of the post-extending PWM signal having a second level.

20 Claims, 12 Drawing Sheets

APPARATUS FOR DRIVING LIGHT EMITTING DEVICE

CROSS-REFERENCE TO RELATED APPLICATION

This application is based upon and claims the benefit of priority from Japanese Patent Application No. 2015-200198, filed on Oct. 8, 2015, the entire contents of which are incorporated herein by reference.

TECHNICAL FIELD

The present disclosure relates to an apparatus for driving a light emitting device.

BACKGROUND

Conventionally, various light emitting device driving apparatuses for driving a light emitting device such as a light emitting diode (LED) have been developed.

Here, a configuration of a constant current control circuit included in an LED driver IC is illustrated in FIG. 9 as an example of a conventional light emitting device driving apparatus. A conventional constant current control circuit 100 illustrated in FIG. 9 is a circuit for controlling an LED current IL flowing through an LED 110 to be constant. As illustrated in FIG. 9, the constant current control circuit 100 includes an error amplifier 101, a MOS transistor 102, a resistor 103, a switch 104, a switch 105, a switch 106, and an inverter 107.

The connection relations in the constant current control circuit 100 will be described in detail. A cathode of an LED 110 is connected to a drain of the MOS transistor 102 configured with an n-channel metal-oxide-semiconductor field-effect transistor (MOSFET), and one end of the resistor 103 is connected to a source of the MOS transistor 102. The other end of the resistor 103 is connected to an application terminal of a ground potential. A connection point between the MOS transistor 102 and the resistor 103 is connected to an inverting terminal of the error amplifier 101 via the switch 105. A reference voltage Vref is applied to a non-inverting terminal of the error amplifier 101. A gate of the MOS transistor 102 and one end of the switch 106 are connected to an output terminal of the error amplifier 101 via the switch 104. An application terminal of the ground potential is connected to the other end of the switch 106.

Further, a pulse-type pulse width modulation (PWM) signal Spwm is input to the constant current control circuit 100. The switches 104 and 105 are turned on or off depending on a level of the PWM signal Spwm. Further, the switch 106 is turned on or off according to an output level of the inverter 107, which inverts and outputs an input PWM signal Spwm.

During an ON period (period of high level) of the PWM signal Spwm, the switches 104 and 105 are turned on and the switch 106 is turned off. In this state, the error amplifier 101 drives the MOS transistor 102 such that a feedback voltage Vb, which is generated as an LED current IL, is current/voltage-converted by the resistor 103 and matches the reference voltage Vref, thereby controlling the LED current IL to be constant. Meanwhile, during an OFF period (period of low level) of the PWM signal Spwm, the switches 104 and 105 are turned off and the switch 106 is turned on. Accordingly, the MOS transistor 102 is turned off and the LED current IL does not flow.

Thus, by adjusting an ON duty (ratio of ON period to a certain cycle) of the PWM signal Spwm, a period during which the LED current IL flows is adjusted, which makes it possible to perform dimming of the LED 110.

Recently, automotive displays, which are display devices mounted in vehicles, have been supplied. In the automotive displays, it is required to change brightness depending on daytime vehicle driving, nighttime driving, or driving within a tunnel. Specifically, it is required to increase brightness during daytime driving and to decrease brightness during nighttime driving or driving within a tunnel. Further, in particular, brightness should be further adjusted in order to respond to a user's pupil color. For example, the brightness should be decreased for someone with a lighter pupil color (westerner or the like).

Thus, a dimming ratio (=maximum brightness: minimum brightness) of an LED included in a backlight device provided in an automotive display is required to be 20000:1. For example, when the conventional constant current control circuit 100 as described above is applied to drive such an LED, the following problems may arise.

A cycle of the PWM signal Spwm is required to be 5 ms or less to make it difficult for a user to recognize a flicker. For example, when a cycle is 5 ms and a dimming ratio (ratio of ON period to cycle) is 1/10000, an ON period of the PWM signal Spwm is 500 ns. A waveform example of the PWM signal Spwm and the LED current IL in this case is illustrated in the timing chart of FIG. 10. At a timing t10 at which the PWM signal Spwm rises to a high level, the switches 104 and 105 are turned on and a constant current control is started by the constant current control circuit 100. Thereafter, at a timing t11, the LED current IL reaches a set current Iset and is controlled to be constant. Thereafter, at a timing t12 at which the PWM signal Spwm falls to a low level, the switches 104 and 105 are turned off and the switch 106 is turned on, so that the MOS transistor 102 is turned off, and the LED current IL is reduced to zero.

In other words, the LED current IL reaches the set current Iset through a response delay period Td, which is a period from timing t10 to tn. Since the response delay period Td is shorter than the ON period 500 ns of the PWM signal Spwm as in FIG. 10, the LED current IL can reach the set current Iset within the ON period.

In contrast, when a dimming ratio is 1/20000 at the cycle of 5 ms as described above, the ON period of the PWM signal Spwm is reduced to 250 ns. In this case, a timing chart similar to that illustrated in FIG. 10 is illustrated in FIG. 11. In this case, as illustrated in FIG. 11, since the response delay time Td (period from timing t20 to t22) is longer than the ON period, the LED current IL may not reach the set current Iset at a timing t21 at which the PWM signal Spwm falls to a low level and the LED current IL is turned off.

The reason for the response delay time Td as described above will be described using the timing chart of FIG. 12. As illustrated in FIG. 12, at a timing t30 at which the PWM signal Spwm rises, the switches 104 and 105 are turned on, and a voltage Va, which is an output from the error amplifier 101, rises at a certain response speed. At an early stage, since no current flows through the MOS transistor 102, the LED current IL is zero, but, at a timing t31 at which the voltage Va reaches a threshold voltage Va1 during rising, current flows through the MOS transistor 102, so that the LED current IL starts to flow.

As the LED current IL rises, the feedback voltage Vb rises, and at a timing t33 at which the feedback voltage Vb reaches the reference voltage Vref during an ON period of the PWM signal Spwm (for example, a case of ON period such as the broken line of FIG. 12), the LED current IL reaches the set current Iset. Thereafter, the LED current IL is controlled to be constant at the set current Iset.

Thus, the response delay time Td is generated as the sum of a period Td1 during which the voltage Va rises to reach a voltage at which the LED current IL starts to flow and a period Td2 from when the LED current IL starts to flow until the LED current IL reaches the set current Iset.

For example, as illustrated in FIG. 13, when a response speed of the error amplifier 101 is increased to rapidly increase the voltage Va, the LED current IL is ringing, which is recognized as flickering to a user. Thus, in order to prevent this, as illustrated in FIG. 12, the response speed of the error amplifier 101 is required to be lowered to a degree and a generation of a certain degree of the response delay time Td is a precondition.

SUMMARY

The present disclosure provides some embodiments of an apparatus for driving a light emitting device, which is capable of appropriately driving a light emitting device even at a low dimming ratio, and expanding a dimming range.

According to one embodiment of the present disclosure, there is provided an apparatus for driving a light emitting device, including: a constant current control circuit configured to control a current flowing through the light emitting device to be constant; and an extension circuit configured to generate a post-extending PWM signal obtained by extending a period of an input PWM signal having a first level, wherein the constant current control circuit is turned on during the period of the post-extending PWM signal having the first level, and the constant current control circuit is turned off during a period of the post-extending PWM signal having a second level (first configuration).

In the first configuration, the extension circuit may include: a ring oscillator; a first D-type flip flop having a clock terminal to which an output signal from the ring oscillator is input, a Q bar terminal, and a D terminal circuit-shorted to the Q bar terminal; a second D-type flip flop having a clock terminal to which an output signal of the Q bar terminal is input, a Q terminal, and a D terminal to which a predetermined voltage is applied; a first inverter to which the PWM signal is input; a second inverter installed at a next stage of the first inverter; a first OR circuit to which a reset signal and an output from the second inverter are input; a second OR circuit to which an output from the first OR circuit and an output of the Q terminal are input and its output is input to the ring oscillator; a third inverter to which the output of the Q terminal is input; and a third OR circuit to which an output from the third inverter and the output from the second inverter are input, wherein the output from the first inverter is input to a reset terminal of the second D-type flip flop (second configuration).

In addition, in the first configuration, the apparatus may further include a first driving control part configured to control driving of a switching element of a switching power part which outputs an output voltage such that the output voltage is constant based on the output voltage applied to a current input terminal of the light emitting device (third configuration).

Further, in the third configuration, the first driving control part may include: an error amplifier to which a voltage obtained by dividing the output voltage and a reference voltage are input; a comparator configured to receive an output from the error amplifier and an output from an oscillator which outputs a triangular wave and to output a PWM signal; and a driver controlled based on the PWM signal output from the comparator and configured to drive the switching element (fourth configuration).

Further, in the fourth configuration, the switching power part may include a plurality of switching elements configured to step up and down a voltage, and the first driving control part may include a driver controlled based on the PWM signal output from the comparator and configured to drive the plurality of switching elements (fifth configuration).

Further, in the third configuration, the apparatus may further include: a second driving control part configured to control driving of the switching element such that an output terminal voltage is constant based on the output terminal voltage applied to a current output terminal of the light emitting device; and a switching control circuit configured to switch driving of the first driving control part and the second driving control part depending on the period of the PWM signal having the first level (sixth configuration).

Further, in the sixth configuration, the first driving control part and the second driving control part may include a first terminal to which the voltage obtained by dividing the output voltage is input, a second terminal to which the output terminal voltage is input, and an error amplifier to which the reference voltage is input, and connection/disconnection of a path through which the voltage obtained by dividing the output voltage is input to the first terminal and a path through which the output terminal voltage is input to the second terminal are switched depending on a switching signal output from the switching control circuit (seventh configuration).

Further, in the seventh configuration, a condenser for setting a threshold value of the period of the PWM signal having the first level to switch driving may be connectable to the switching control circuit (eighth configuration).

Further, in the eighth configuration, the constant current control circuit may include: a transistor connected to the light emitting device; a resistor configured to convert a current flowing through the transistor into a voltage; and an error amplifier to which the reference voltage and the voltage converted by the resistor are input and configured to drive the transistor (ninth configuration).

According to another embodiment of the present disclosure, there is provided a backlight device, including: a light emitting device; and the light emitting device driving apparatus having the above configuration, configured to drive the light emitting device.

According to still another embodiment of the present disclosure, there is provided an automotive display including the backlight device having the above configuration.

DETAILED DESCRIPTION

Embodiments of the present disclosure will be now described in detail with reference to the drawings. Here, an LED will be described as an example of a light emitting device. A configuration of an LED driver IC (example of an apparatus for driving a light emitting device) according to an embodiment of the present disclosure is illustrated in FIG. 1.

Figure 1:
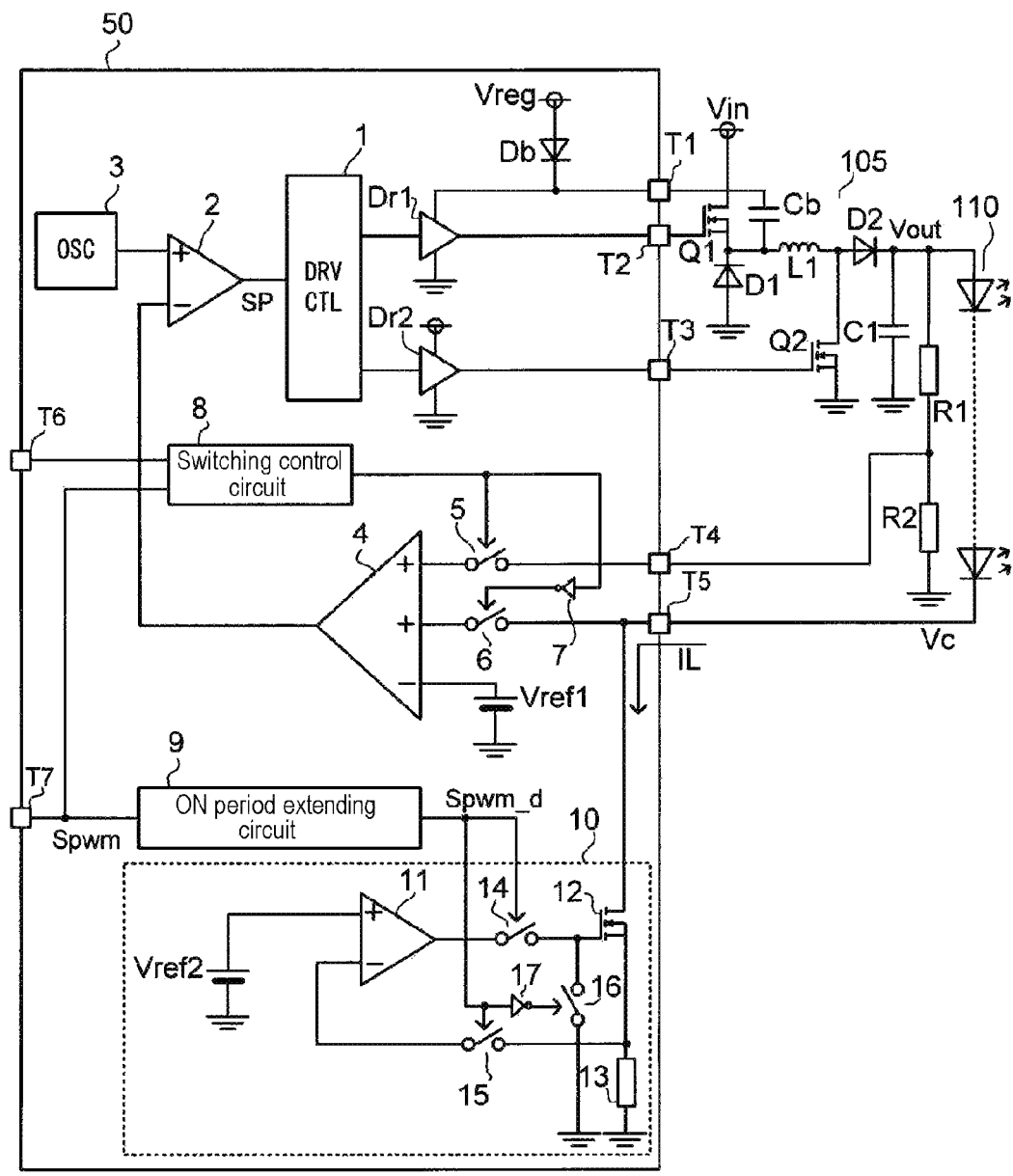
FIG. 1 is a view illustrating a configuration of an LED driver IC according to an embodiment of the present disclosure.

An LED driver IC 50 according to an embodiment of the present disclosure illustrated in FIG. 1 is a semiconductor integrated circuit (IC) device configured by integrating a driver Dr1, a driver Dr2, a diode Db, a driver control part 1, a comparator 2, an oscillator 3, an error amplifier 4, a switch 5, a switch 6, an inverter 7, a switching control circuit 8, an ON period extending circuit 9, and a constant current control circuit 10. Further, the LED driver IC 50 has a plurality of external terminals (only external terminals T1 to T7 are representatively illustrated in FIG. 1) for establishing electrical connections with the outside.

A switching power part 105 including a switching element Q1, a switching element Q2, a diode D1, a diode D2, a coil L1, and a condenser C1, which is capable of stepping up and down an input voltage Vin, resistors R1 and R2 for feeding-back an output voltage Vout, and an LED 110 are installed outside the LED driver IC 50.

The input voltage Vin is applied to a drain of the switching element Q1 configured with an n-channel MOSFET, and a cathode of the diode D1 is connected to a source of the switching element Q1. An anode of the diode D1 is connected to an application terminal of a ground potential. A gate of the switching element Q1 is connected to an output terminal of the driver Dr1 through the external terminal T2.

One end of the coil L1 is connected to a connection point between the switching element Q1 and the diode D1, and an anode of the diode D2 and a drain of the switching element Q2 configured with an n-channel MOSFET are commonly connected to the other end of the coil L1. A source of the switching element Q2 is connected to the application terminal of the ground potential. A gate of the switching element Q2 is connected to an output terminal of the driver Dr2 through an external terminal T3. One end of the condenser C1 is connected to a cathode of the diode D2, and the other end of the condenser C1 is connected to the application terminal of the ground potential.

Further, one end of a condenser Cb for bootstrap is connected to a connection point between the switching element Q1 and the coil L1. A power terminal of the driver Dr1, together with a cathode of the diode Db for bootstrap, is connected to the other end of the condenser Cb. An internal power supply voltage Vreg is applied to an anode of the diode Db. Also, the internal power supply voltage Vreg is applied to a power terminal of the driver Dr2.

The driver Dr1 outputs, as a driving signal, a voltage obtained by adding the input voltage Vin to a voltage (=internal power supply voltage Vreg−forward voltage of diode Db) generated in the condenser Cb for bootstrap by charging with the internal power supply voltage Vreg to the gate of the switching element Q1, thereby turning on the switching element Q1. Further, the driver Da outputs a ground potential as a driving signal to the gate of the switching element Q1, thereby turning off the switching element Q1. The driver Da outputs the driving signal depending on a control signal from the driver control part 1.

Further, the driver Dr2 outputs the internal power supply voltage Vreg and the ground potential as driving signals to the switching element Q2, respectively, thereby turning on and off the switching element Q2. The driver Dr2 outputs the driving signal depending on the control signal from the driver control part 1.

Here, when an OFF state of the switching element Q2 is kept by the driver Dr2 and an ON/OFF operation of the switching element Q1 is controlled by the driver Dr1, the LED driver IC perform in a step-down mode in which the input voltage Vin is stepped down to output an output voltage Vout. On the other hand, when an ON state of the switching element Q1 is kept by the driver Dr1 and an ON/OFF operation of the switching element Q2 is controlled by the driver Dr2, the LED driver IC perform in a step-up mode in which the input voltage Vin is stepped up to output an output voltage Vout. These modes are used based on the number of stages of an LED element or a battery voltage according to an application.

Further, in this embodiment, it is configured such that the output voltage Vout applied to the anode of the LED 110 or a cathode voltage Vc generated in the cathode of the LED 110 can be stabilized through feed-back control.

An application terminal (connection point between the resistors R1 and R2) of a voltage generated by dividing the output voltage Vout by the resistors R1 and R2 is connected to a first non-inverting terminal of the error amplifier 4 through the external terminal T4 and the switch 5. Further, the cathode of the LED 110 is connected to a second non-inverting terminal of the error amplifier 4 through an external terminal T5 and the switch 6. A predetermined reference voltage Vref1 is applied to an inverting terminal of the error amplifier 4.

An output terminal of the error amplifier 4 is connected to an inverting terminal of the comparator 2. An output terminal of the oscillator 3 for generating a triangular wave is connected to a non-inverting terminal of the comparator 2. An output terminal of the comparator 2 is connected to an input terminal of the driver control part 1.

The switch 5 and the switch 6 are turned on and off by the switching control circuit 8. When the switch 5 is turned on and the switch 6 is turned off by a switching signal from the switching control circuit 8, the error amplifier 4 outputs an output signal to the comparator 2 based on a divided voltage of the output voltage Vout input to the first non-inverting terminal and the reference voltage Vref1 input to the inverting terminal. Further, the comparator 2 outputs a PWM signal in a pulse form to the control part 1 based on a comparison between the corresponding output signal and the triangular wave input from the oscillator 3. The driver control part 1 controls the switching element Q1 or Q2 to be turned on and off by controlling the driver Dr1 or Dr2 based on the PWM signal. Thus, the output voltage Vout is controlled to be constant.

Meanwhile, when the switch 5 is turned off and the switch 6 is turned on by the switching signal from the switching control circuit 8, the error amplifier 4 outputs an output signal to the comparator 2 based on a cathode voltage Vc input to a second non-inverting terminal and the reference voltage Vref1 input to a non-inverting terminal. Further, the cathode voltage Vc generated in the cathode of the LED 110 can be controlled to be constant by controlling the switching element Q1 or Q2 to be turned on and off based on the generated PWM signal. This control switching thereof will be described in detail later.

Figure 9:
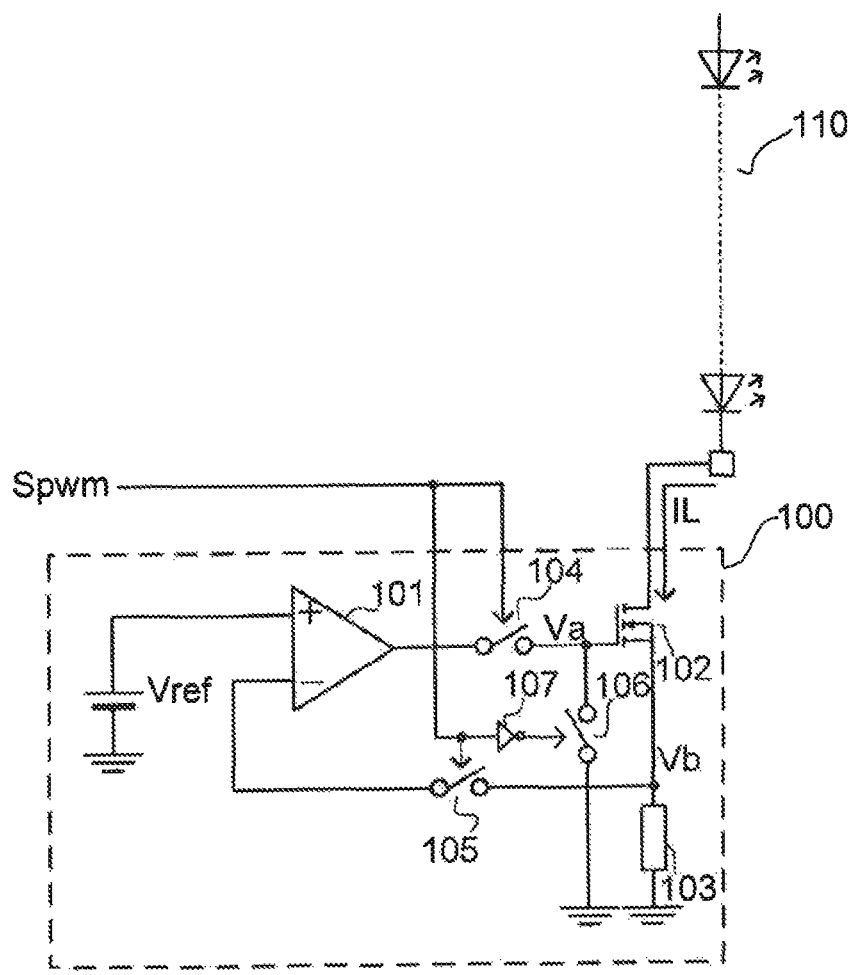
FIG. 9 is a view illustrating a configuration of a constant current control circuit according to the related example.
Figure 10:
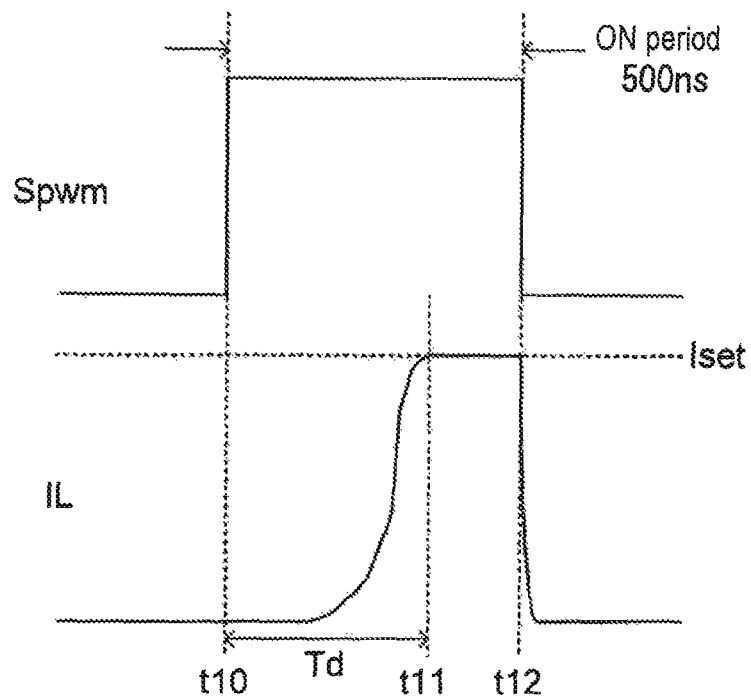
FIG. 10 is a timing chart illustrating a behavior (when an ON period of a PWM signal is relatively long) of an LED current according to the related example.
Figure 11:
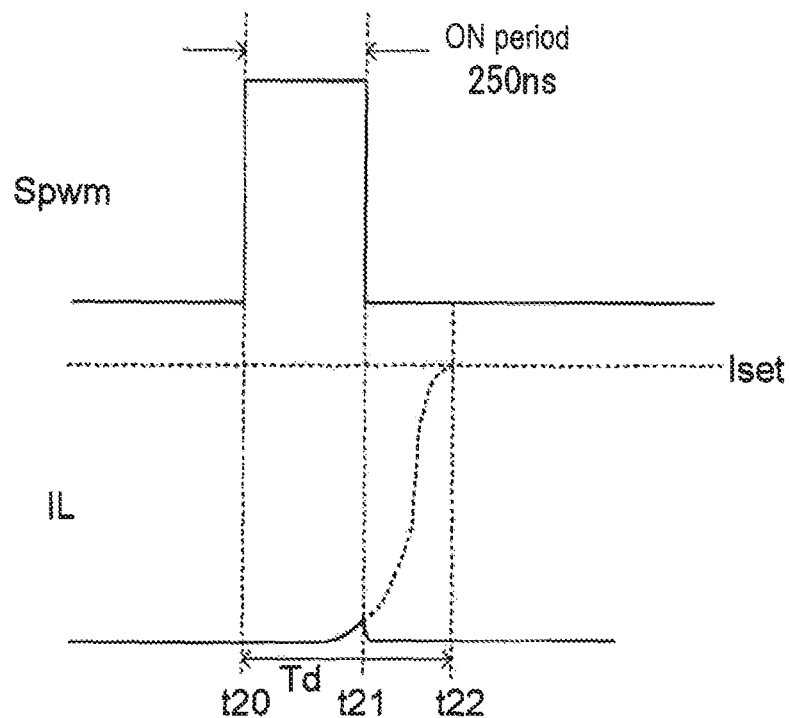
FIG. 11 is a timing chart illustrating a behavior (when an ON period of a PWM signal is relatively short) of an LED current according to the related example.
Figure 12:
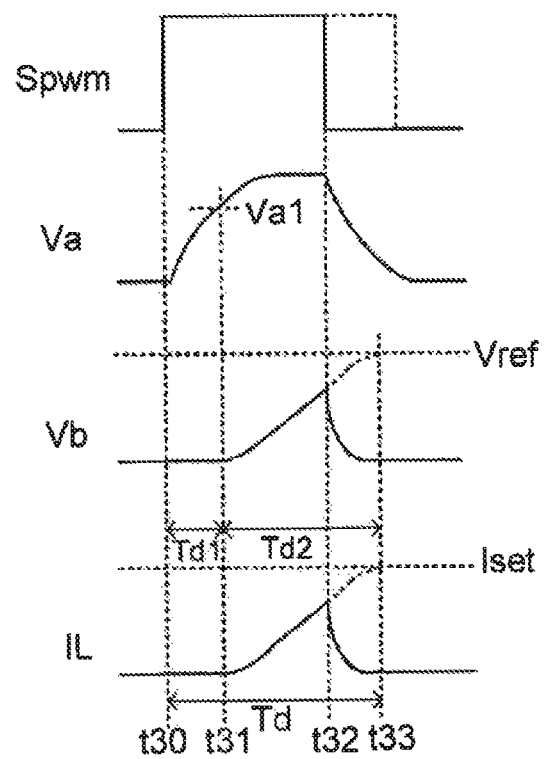
FIG. 12 is a timing chart illustrating a response delay of an LED current.
Figure 13:
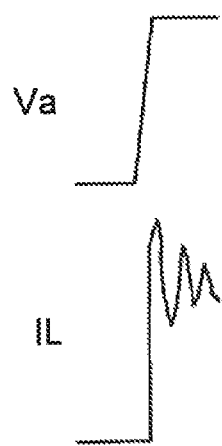
FIG. 13 is a timing chart illustrating a behavior of an LED current when a response speed of an error amplifier is high.

As illustrated in FIG. 1, the constant current control circuit 10 of the LED driver IC 50 includes an error amplifier 11, a MOS transistor 12, a resistor 13, switches 14 to 16, and an inverter 17, which is the same configuration as that of the constant current control circuit 100 (FIG. 9) described above, so that it will not be described herein. Also, the reference voltage Vref2 is applied to a non-inverting terminal of the error amplifier 11. Further, a drain of the MOS transistor 12 is connected to the cathode of the LED 110 through an external terminal T5.

Figure 2:
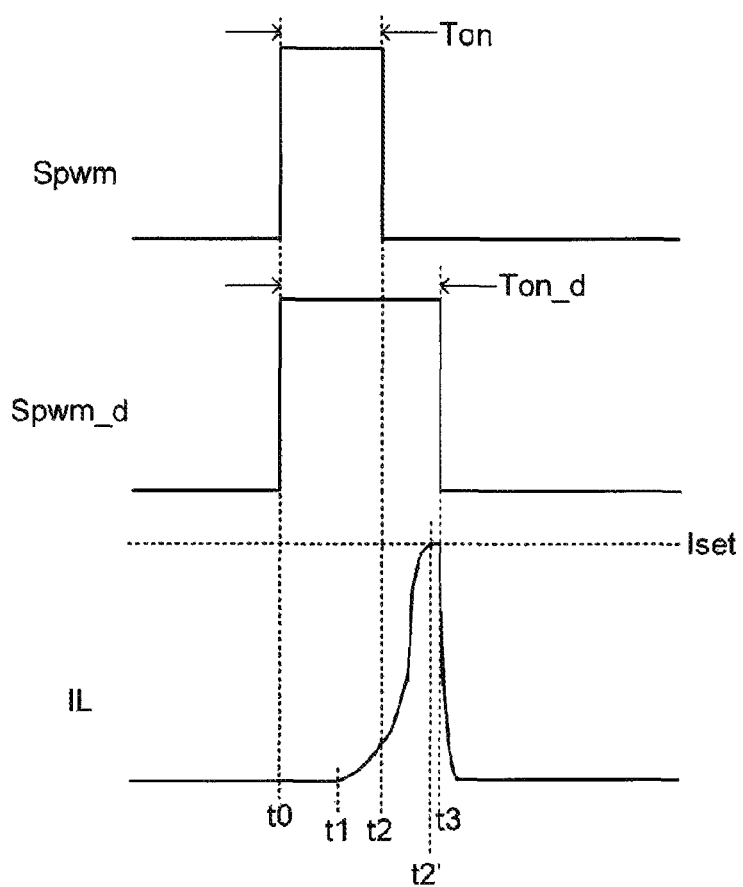
FIG. 2 is a timing chart for LED current control according to an embodiment of the present disclosure.

Next, the ON period extending circuit 9 will be described using the timing chart illustrated in FIG. 2. The PWM signal Spwm is input to the ON period extending circuit 9 through an external terminal 7 from the outside. As illustrated in FIG. 2, the ON period extending circuit 9 generates and outputs a post-extending PWM signal spwm_d, which is a signal having an ON period Ton_d obtained by extending an ON period Ton of the input PWM signal Spwm.

The switches 14 to 16 are turned on and off depending on the post-extending PWM signal spwm_d. More specifically, during an ON period of the post-extending PWM signal spwm_d, the switches 14 and 15 are turned on and the switch 16 is turned off. On the other hand, during an OFF period of the post-extending PWM signal spwm_d, the switches 14 and 15 are turned off and the switch 16 is turned on.

Accordingly, as illustrated in FIG. 2, at a timing t0 at which the post-extending PWM signal spwm_d rises to a high level, the switches 14 and 15 are turned on, but as mentioned above, the LED current IL is zero at an initial stage due to a response speed of the error amplifier 11, and starts to flow at a timing t1 on the way.

Here, for example, when a cycle of the PWM signal Spwm is 5 ms and a dimming ratio is 1/20000, the ON period Ton is greatly shortened to 250 ns. In this case, at a timing t2 at which the PWM signal Spwm falls to a low level, the LED current IL has not reached the set current Iset yet. However, since the post-extending PWM signal spwm_d has a high level (within ON period) from the timing t2 to a timing t3 at which the post-extending PWM signal spwm_d falls, the LED current IL can further rise at the timing t2, and thus, the LED current IL can reach the set current Iset at a timing t2' before the timing t3.

Thus, according to this embodiment, even when a dimming ratio is very low, the LED current IL can reach the set current Iset, and therefore, the LED 110 can be appropriately driven.

Figure 3:
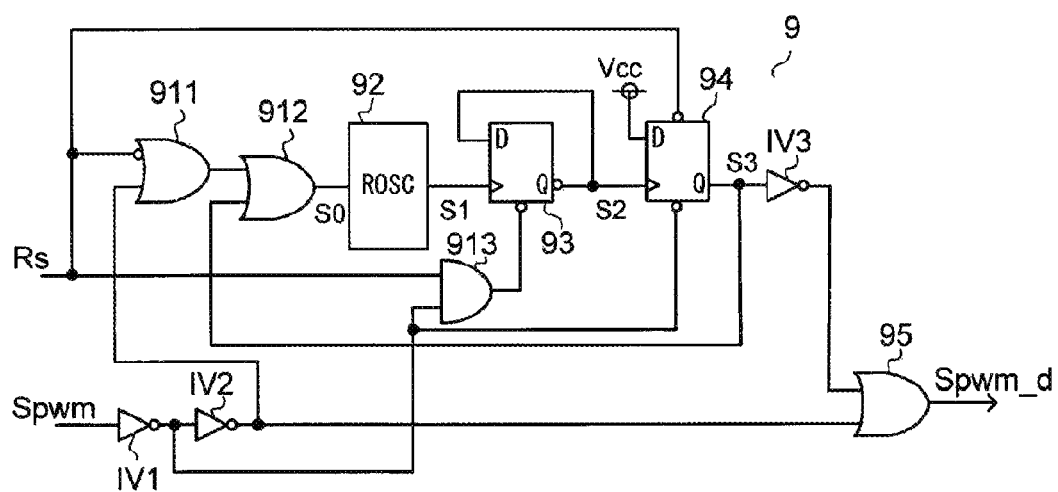
FIG. 3 is a view illustrating a configuration example of an ON period extending circuit according to an embodiment of the present disclosure.

Here, an example of a specific configuration of the ON period extending circuit 9 is illustrated in FIG. 3. The ON period extending circuit 9 illustrated in FIG. 3 includes a first OR circuit 911, a second OR circuit 912, an AND circuit 913, a ring oscillator 92, a D-type flip flop 93, a D-type flip flop 94, a third OR circuit 95, and inverters IV1 to IV3.

An output terminal of the ring oscillator 92 is connected to a clock terminal of the D-type flip flop 93. A Q bar terminal of the D-type flip flop 93 is short-circuited to a D terminal. The Q bar terminal of the D-type flip flop 93 is connected to a clock terminal of the D-type flip flop 94. A predetermined voltage Vcc is applied to a D terminal of the D-type flip flop 94. A Q terminal of the D-type flip flop 94 is connected to an input terminal of the inverter IV3. The inverter IV2 is connected to a next stage of the inverter IV1 to which the PWM signal Spwm is input. An output from the inverter IV3 and an output from the inverter IV2 are input to the third OR circuit 95.

A connection point between the inverter IV1 and the inverter IV2 is connected to one input terminal of the AND circuit 913 and also connected to a first reset terminal of the D-type flip flop 94. A reset signal Rs is input to the other input terminal of the AND circuit 913, the reset signal Rs is input to one input terminal of the first OR circuit 911, and an output from the inverter IV2 is input to the other input terminal of the first OR circuit 911. An output terminal of the first OR circuit 911 is connected to one input terminal of the second OR circuit 912, and a Q terminal of the D-type flip flop 94 is connected to the other input terminal of the second OR circuit 912. An output from the second OR circuit 912 is input to the ring oscillator 92. Also, the reset signal Rs is input to a second reset terminal of the D-type flip flop 94.

Figure 4:
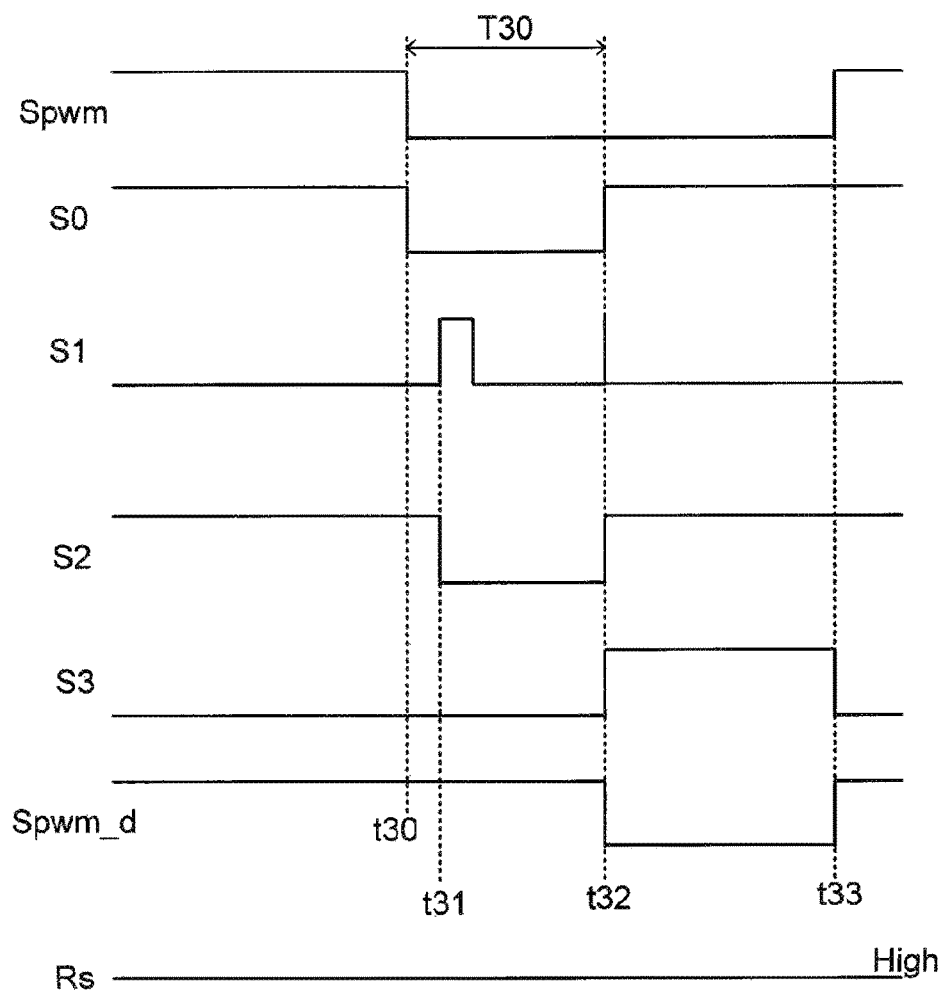
FIG. 4 is a timing chart illustrating an operation of the ON period extending circuit illustrated in FIG. 3.

A timing chart showing the signals at respective parts of the ON period extending circuit 9 is illustrated in FIG. 4. Waveform examples of the PWM signal Spwm, an output signal S0 from the second OR circuit 912, an output signal S1 from the ring oscillator 92, an output signal S2 from the Q bar terminal of the D-type flip flop 93, an output signal S3 from the Q terminal of the D-type flip flop 94, the post-extending PWM signal Spwm_d, which is an output from the third OR circuit 95, and the reset signal Rs are illustrated sequentially from above in FIG. 4. The reset signal Rs is assumed to be kept at a high level.

As illustrated in FIG. 4, at a timing t30, when the PWM signal Spwm falls from a high level to a low level, the output signal S0 falls from a high level to a low level and the ring oscillator 92 start to operate. Thereafter, at a timing t31, the ring oscillator 92 outputs the output signal S1 keeping a high level only during a predetermined period. The start of the output signal S1 at this time functions as a trigger such that the output signal S2 from the Q bar terminal of the D-type flip flop 93 falls from a high level to a low level. At this time, the output signal S3 is kept at a low level and the post-extending PWM signal Spwm_d is kept at a high level.

Thereafter, at a timing t32, when the output signal S1 of the ring oscillator 92 rises again, the output signal S2 rises from the low level to the high level, which functions as a trigger such that the output signal S3 from the Q terminal of the D-type flip flop 94 rises from the low level to the high level. Accordingly, since the output signal S0 has a high level, the ring oscillator 92 is stopped and the output signal S1 has a low level. As the output signal S3 rises, the post-extending PWM signal Spwm_d falls from the high level to a low level.

Thereafter, at a timing t33, when the PWM signal Spwm rises from the low level to the high level, an output from the inverter IV1 having a low level is input to the first reset terminal of the D-type flip flop 94, the D-type flip flop 94 is reset, and the output signal S3 from the Q terminal thereof has a low level. Accordingly, the post-extending PWM signal Spwm_d rises from the low level to a high level. At this time, the output signals S0, S1, and S2 are kept in a previous state. Thereafter, the same operation is repeated.

As a result, through this operation, the post-extending PWM signal Spwm_d becomes a signal obtained by extending an ON period of the PWM signal only for the period T30 (period from the timing t30 to t32).

Next, an operation of the LED driver IC 50 including control switching by the switching control circuit 8 will be described using the timing charts illustrated in FIGS. 5 and 6.

A PWM signal Spwm is input to the switching control circuit 8 through the external terminal T7 from the outside. The switching control circuit 8 controls the switch 5 and the switch 6 to be turned on and off by comparing the ON period of the input PWM signal Spwm with a predetermined threshold value. Further, a condenser (not shown) may be externally connected to the external terminal T6 connected to the switching control circuit 8, and the threshold value may be set by capacity of the corresponding condenser.

More specifically, for example, when the cycle of the PWM signal Spwm is 5 ms and an ON period is equal to or greater than a threshold value 10 μs (dimming ratio of 1/500), the switching control circuit 8 turns off the switch 5 and turns on the switch 6. Waveform examples of the signals in this case are illustrated in the timing chart of FIG. 5.

Figure 5:
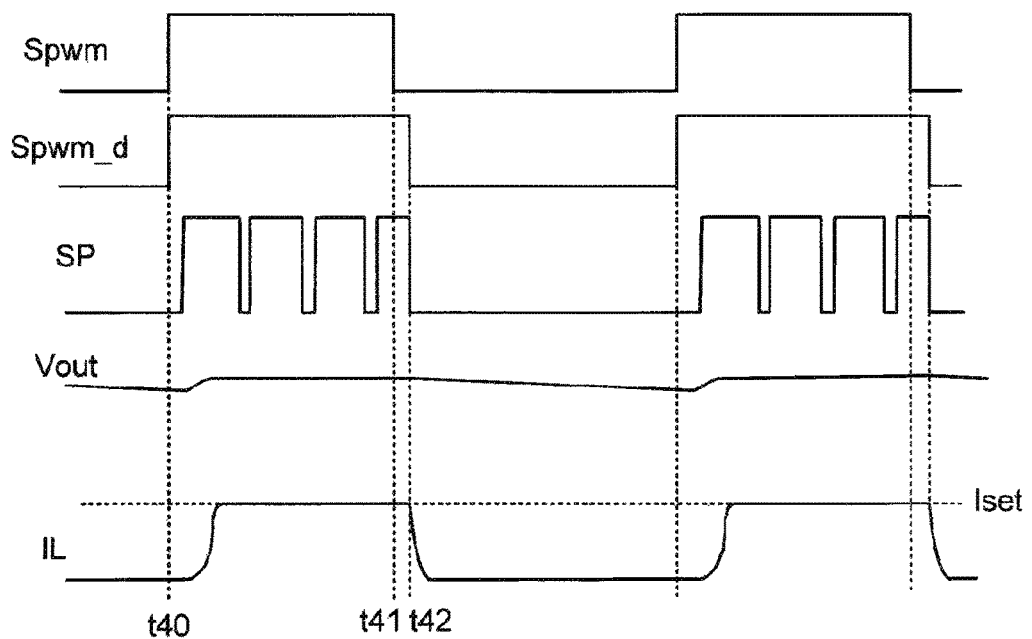
FIG. 5 is a timing chart illustrating an operation (mode when a dimming ratio is high) of an LED driver IC according to an embodiment of the present disclosure.

As illustrated in FIG. 5, at a timing t40, when the PWM signal Spwm and the post-extending PWM signal Spwm_d rise to a high level, the switches 14 and 15 are turned on and the LED current IL rises to the set current Iset. At this time, a forward voltage generated in the LED 110 is increased. Thus, for example, if the output voltage Vout is set to about 30V, the cathode voltage Vc is set to about 1V, and if the reference voltage Vref1 is set to 1V, a PWM signal SP is generated by the comparator 2 such that the cathode voltage Vc is constant as 1V. Accordingly, an ON/OFF operation of the switching element Q1 or Q2 is controlled.

Thereafter, while the LED current IL is controlled to be constant such that it becomes the set current Iset, at a timing t41, the PWM signal Spwm falls, and thereafter at a timing t42, the post-extending PWM signal Spwm_d falls. Accordingly, since the switches 14 and 15 are turned off and the switch 16 is turned on, the LED current IL is reduced to zero. At this time, the forward voltage generated in the LED 110 is lowered, and, in the above example, the cathode voltage Vc rises to for example, about 10V. Thus, the cathode voltage Vc is considerably increased in comparison to the reference voltage Vref of 1V, the PWM signal SP is kept at the low level, and the switching element Q1 or Q2 is kept in an OFF state.

In the control method illustrated in FIG. 5, since the switching control is performed only during the ON period of the post-extending PWM signal Spwm_d, if a dimming ratio is low and the ON period of the PWM signal Spwm is relatively short, it is impossible to keep the output voltage Vout at a predetermined voltage level.

Thus, in this embodiment, for example, when the cycle of the PWM signal Spwm is 5 ms and the ON period is shorter than the threshold value 10 μs (dimming rate of 1/500), the switching control circuit 8 is turned on, the switch 5 is turned on, and the switch 6 is turned off. Waveform examples of the signals in this case are illustrated in the timing chart of FIG. 6.

Figure 6:
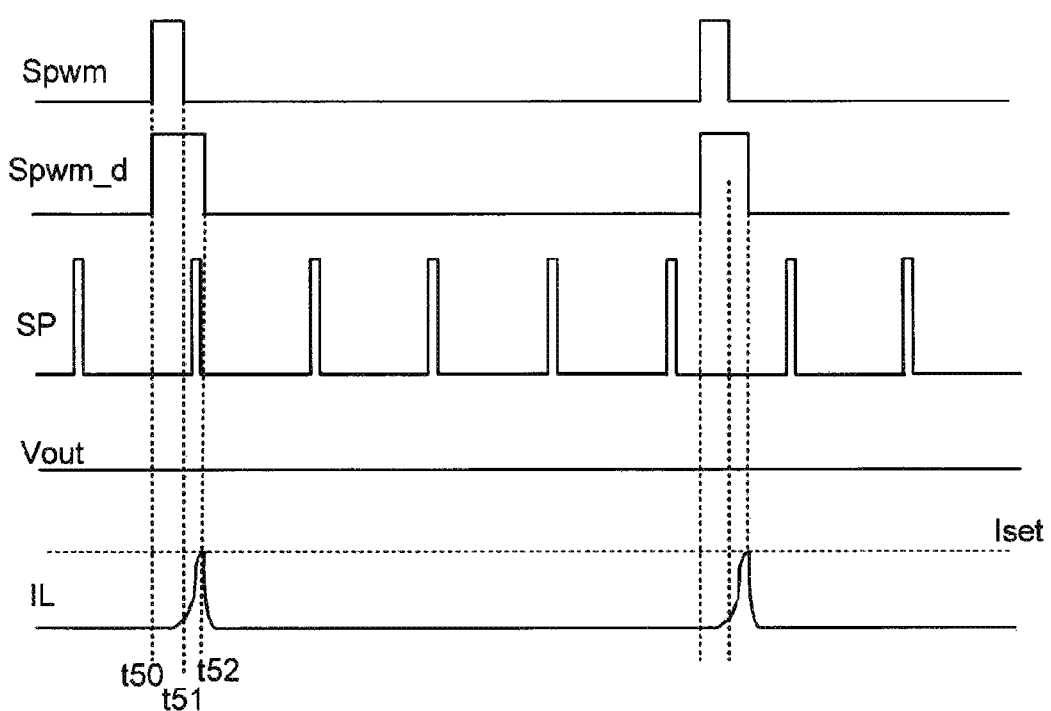
FIG. 6 is a timing chart illustrating an operation (mode when a dimming ratio is low) of an LED driver IC according to an embodiment of the present disclosure.

In this control mode, as illustrated in FIG. 6, the PWM signal SP is generated based on a voltage obtained by dividing the output voltage Vout. Thus, the PWM signal SP is generated irrespective of the PWM signal Spwm, and thus, it is possible to keep the output voltage Vout at a predetermined voltage.

Further, as illustrated in FIG. 6, although the switches 14 and 15 are turned on and the LED current IL rises at a timing t50 at which the PWM signal Spwm and the post-extending PWM signal Spwm_d rise, since the ON period of the PWM signal Spwm is short, the LED current IL does not reach the set current Iset at a timing t51 at which the PWM signal Spwm falls. However, since the ON period of the post-extending PWM signal Spwm_d continues up to a timing t52, the LED current IL can further rise to reach the set current Iset at a timing before a timing t52.

<Applications to Backlight Device>

Figure 7:
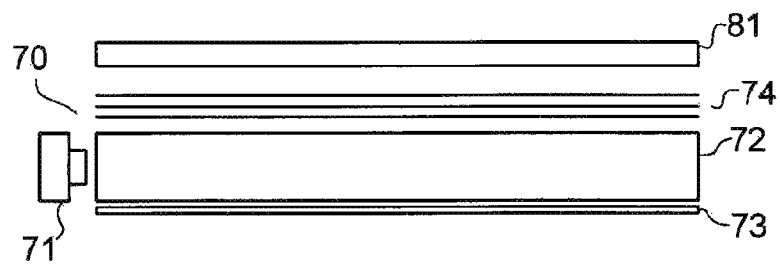
FIG. 7 is a side view illustrating a schematic configuration of a backlight device according to an embodiment of the present disclosure.

A backlight device, which is an example of a target to which the LED driver IC according to the embodiment of the present disclosure described above is applied, will be described. A configuration example of a backlight device to which the LED driver IC according to an embodiment of the present disclosure is applicable is illustrated in FIG. 7. Further, the configuration illustrated in FIG. 7 is a so-called edge light-type backlight device, but the present disclosure is not limited thereto and a direct type configuration may also be applied.

A backlight device 70 illustrated in FIG. 7 is a lighting device for illuminating a liquid crystal panel 81 from a rear side. The backlight device 70 includes an LED light source part 71, a light guide plate 72, a reflector 73, and optical sheets 74. The LED light source part 71 includes an LED and a board on which the LED is mounted. Light output from the LED light source part 71 is incident to the interior of the light guide plate 72 from a side surface thereof. For example, the light guide plate 72, which is formed with an acryl plate, totally reflects an internally incident light to guide the light to an entire interior, and the light is emitted as a planar light from the side where the optical sheets 74 are disposed. The reflector 73 reflects light output from the light guide plate 72 to return the same into the light guide plate 72. The optical sheets 74 include a diffusion sheet, a lens sheet or the like, and serve to make brightness of light illuminated to the liquid crystal panel 81 uniform or enhance brightness.

<Regarding Automotive Display>

It is preferred that the backlight device employing the LED driver IC according to the embodiment of the present disclosure described above is mounted, particularly, on an automotive display. Since the LED driver IC can expand a dimming range of an LED, it is appropriate for an automotive display whose brightness is required to be adjusted in daytime driving, nighttime driving or driving within a tunnel, or the like. In particular, even in a case where brightness is low with very low dimming ratio, since the LED can be appropriately driven, it is possible to perform display appropriate for a user (westerner or the like) such as a driver who has a lighter pupil color.

Figure 8:
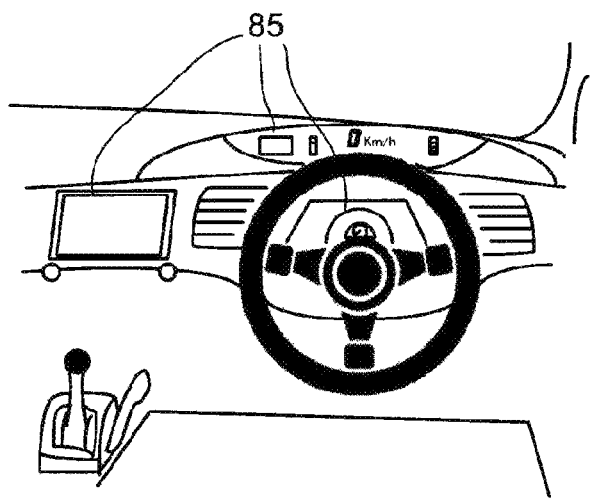
FIG. 8 is a view illustrating a state where an automotive display is disposed in a vehicle according to an embodiment of the present disclosure.

The automotive display is installed in a dashboard in front of a driver's seat of a vehicle, for example, like the automotive display 85 illustrated in FIG. 8. The automotive display 85 may display various images such as, for example, car navigation information, a captured image of a rear side of a vehicle, a speed meter, a fuel gauge, a fuel meter, or a shift position, and provide various types of information to the user.

The present disclosure can be used, for example, in an LED driver IC for vehicle.

<Others>

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

The present disclosure may be employed in, for example, an LED driver IC for vehicle.

According to the present disclosure, it is possible to expand a dimming range capable of appropriately driving a light emitting device even at a low dimming ratio.

What is claimed is:

1. An apparatus for driving a light emitting device, comprising:
    a constant current control circuit configured to control a current flowing through the light emitting device to be constant; and
    an extension circuit configured to generate a post-extending PWM signal obtained by extending a period of a PWM signal having a first level,
    wherein the constant current control circuit is turned on during the period of the PWM signal having the first level, and the constant current control circuit is turned off during a period of the PWM signal having a second level,
    wherein the extension circuit comprises:
        a ring oscillator;
        a first D-type flip flop having a clock terminal to which an output signal from the ring oscillator is input, a Q bar terminal, and a D terminal circuit-shorted to the Q bar terminal;
        a second D-type flip flop having a clock terminal to which an output signal of the Q bar terminal is input, a Q terminal, and a D terminal to which a predetermined voltage is applied;
        a first inverter to which the PWM signal is input;
        a second inverter installed at a next stage of the first inverter;
        a first OR circuit to which a reset signal and an output from the second inverter are input;
        a second OR circuit to which an output from the first OR circuit and an output of the Q terminal are input and its output is input to the ring oscillator;
        a third inverter to which the output of the Q terminal is input; and
        a third OR circuit to which an output from the third inverter and the output from the second inverter are input, and
    wherein the output from the first inverter is input to a reset terminal of the second D-type flip flop.

2. The apparatus of claim 1, further comprising a first driving control part configured to control a switching element of a switching power part which outputs an output voltage such that the output voltage is constant based on an output voltage applied to a current input terminal of the light emitting device.

3. The apparatus of claim 2, wherein the first driving control part comprises:
    an error amplifier to which a voltage obtained by dividing the output voltage and a reference voltage are input;
    a comparator configured to receive an output from the error amplifier and an output from an oscillator which outputs a triangular wave and to output the PWM signal; and
    a driver controlled based on the PWM signal output from the comparator and configured to drive the switching element.

4. The apparatus of claim 3, wherein the switching power part comprises a plurality of switching elements configured to step up and down a voltage, and
    the first driving control part comprises a driver controlled based on the PWM signal output from the comparator and configured to drive the plurality of switching elements.

5. The apparatus of claim 2, further comprising:
    a second driving control part configured to control driving of switching elements such that an output terminal voltage is constant based on the output terminal voltage applied to a current output terminal of the light emitting device; and
    a switching control circuit configured to switch driving of the first driving control part and the second driving control part depending on the period of the PWM signal having the first level.

6. The apparatus of claim 5, wherein the first driving control part and the second driving control part comprise a first terminal to which a voltage obtained by dividing the output voltage is input, a second terminal to which the output terminal voltage is input, and an error amplifier to which a reference voltage is input, and
    connection/disconnection of a path through which the voltage obtained by dividing the output voltage is input to the first terminal and a path through which the output terminal voltage is input to the second terminal are switched depending on a switching signal output from the switching control circuit.

7. The apparatus of claim 5, wherein a condenser for setting a threshold value of the period of the PWM signal having the first level to switch driving is connected to the switching control circuit.

8. The apparatus of claim 1, wherein the constant current control circuit comprises:
    a transistor connected to the light emitting device;
    a resistor configured to convert a current flowing through the transistor into a voltage; and
    an error amplifier to which a reference voltage and the voltage converted by the resistor are input and configured to drive the transistor.

9. A backlight device, comprising:
    a light emitting device; and
    the apparatus for driving light emitting device of claim 1, configured to drive the light emitting device.

10. An automotive display comprising a backlight device, wherein the backlight device comprises:
    a light emitting device; and
    the apparatus for driving light emitting device of claim 1, configured to drive the light emitting device.

11. An apparatus for driving a light emitting device, comprising:
    a constant current control circuit configured to control a current flowing through the light emitting device to be constant;
    an extension circuit configured to generate a post-extending PWM signal obtained by extending a period of a PWM signal having a first level; and a first driving control part configured to control a switching element of a switching power part which outputs an output voltage such that the output voltage is constant based on an output voltage applied to a current input terminal of the light emitting device, wherein the constant current control circuit is turned on during the period of the PWM signal having the first level, and the constant current control circuit is turned off during a period of the PWM signal having a second level, and wherein the first driving control part comprises:
an error amplifier to which a voltage obtained by dividing the output voltage and a reference voltage are input;
a comparator configured to receive an output from the error amplifier and an output from an oscillator which outputs a triangular wave and to output the PWM signal; and
a driver controlled based on the PWM signal output from the comparator and configured to drive the switching element.

12. The apparatus of claim 11, wherein the switching power part comprises a plurality of switching elements configured to step up and down a voltage, and
the first driving control part comprises a driver controlled based on the PWM signal output from the comparator and configured to drive the plurality of switching elements.

13. The apparatus of claim 11, further comprising:
a second driving control part configured to control driving of switching elements such that an output terminal voltage is constant based on the output terminal voltage applied to a current output terminal of the light emitting device; and
a switching control circuit configured to switch driving of the first driving control part and the second driving control part depending on the period of the PWM signal having the first level.

14. The apparatus of claim 13, wherein a condenser for setting a threshold value of the period of the PWM signal having the first level to switch driving is connected to the switching control circuit.

15. The apparatus of claim 11, wherein the constant current control circuit comprises:
a transistor connected to the light emitting device;
a resistor configured to convert a current flowing through the transistor into a voltage; and
an error amplifier to which a reference voltage and the voltage converted by the resistor are input and configured to drive the transistor.

16. A backlight device, comprising:
a light emitting device; and
the apparatus for driving light emitting device of claim 11, configured to drive the light emitting device.

17. An automotive display comprising a backlight device, wherein the backlight device comprises:
a light emitting device; and
the apparatus for driving light emitting device of claim 11, configured to drive the light emitting device.

18. An apparatus for driving a light emitting device, comprising:
a constant current control circuit configured to control a current flowing through the light emitting device to be constant;
an extension circuit configured to generate a post-extending PWM signal obtained by extending a period of a PWM signal having a first level;
a first driving control part configured to control a switching element of a switching power part which outputs an output voltage such that the output voltage is constant based on the output voltage applied to a current input terminal of the light emitting device;
a second driving control part configured to control driving of switching elements such that an output terminal voltage is constant based on the output terminal voltage applied to a current output terminal of the light emitting device; and
a switching control circuit configured to switch driving of the first driving control part and the second driving control part depending on the period of the PWM signal having the first level,
wherein the constant current control circuit is turned on during the period of the PWM signal having the first level, and the constant current control circuit is turned off during a period of the PWM signal having a second level,
wherein the first driving control part and the second driving control part comprise a first terminal to which a voltage obtained by dividing the output voltage is input, a second terminal to which the output terminal voltage is input, and an error amplifier to which a reference voltage is input, and
wherein connection/disconnection of a path through which the voltage obtained by dividing the output voltage is input to the first terminal and a path through which the output terminal voltage is input to the second terminal are switched depending on a switching signal output from the switching control circuit.

19. The apparatus of claim 18, wherein a condenser for setting a threshold value of the period of the PWM signal having the first level to switch driving is connected to the switching control circuit.

20. The apparatus of claim 18, wherein the constant current control circuit comprises:
a transistor connected to the light emitting device;
a resistor configured to convert a current flowing through the transistor into a voltage; and
an error amplifier to which a reference voltage and the voltage converted by the resistor are input and configured to drive the transistor.

* * * * *